////////////////////////////////////////////////////////////////

3,288,851
PROCESS FOR THE BROMINATION OF PHENYLUREAS
Henry Martin, Basel, Hans Aebi, Riehen, and Ludwig Ebner, Stein, Aargan, Switzerland, assignors to Ciba Limited, Basel, Switzerland, a Swiss company
No Drawing. Filed May 1, 1962, Ser. No. 191,442
Claims priority, application Switzerland, May 6, 1961, 5,336/61
8 Claims. (Cl. 260—453)

The present invention is based on the observation that brominated urea derivatives of the general formula

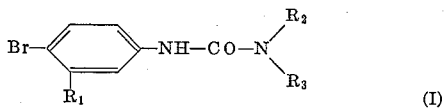

in which $R_1$ represents a hydrogen atom or a lower alkyl or alkoxy group or a halogen atom, $R_2$ represents a hydrogen atom or a lower alkyl or alkoxy group, and $R_3$ represents a lower alkyl group, or in which $R_2$ and $R_3$ together with the nitrogen atom form a ring system are obtained in a surprisingly smooth reaction and in excellent yield by treating a urea derivative of the general formula

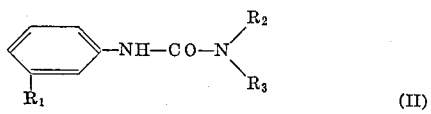

in which $R_1$, $R_2$ and $R_3$ have the meanings given above, with a brominating agent.

The compounds so obtained are excellent agents for combating weeds and, depending on the concentration at which they are used or on the nature of the substituents $R_1$ to $R_3$, they can be used as herbicides having a total or selective action. The process of the invention has the advantage that it leads to the production of the valuable compounds of the general Formula I in an especially simple and economical manner. The smooth and unitary course of the reaction could not be foreseen, since the starting materials to be brominated contain other reactive groups, for example, the

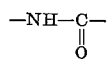

group into which the bromine might be expected to enter.

As compounds that are specially easily obtained by the process of the invention there may be mentioned those compounds of the general Formula I, in which $R_1$ represents a hydrogen atom or a methyl or methoxy group or a halogen atom, $R_2$ represents a hydrogen atom or a methyl, ethyl or methoxy group, $R_3$ represents an alkyl group containing 1 to 4 carbon atoms, and in which $R_2$ and $R_3$ may together with the nitrogen atom form a five or six-membered ring system. Among these compounds there may be mentioned more especially those in which $R_1$ represents a hydrogen atom or a methyl goup or a Br or Cl atom, $R_2$ represents a hydrogen atom or a methyl or methoxy group, $R_3$ represents a methyl, ethyl, propyl or butyl group, or $R_2$ and $R_3$ together with the nitrogen represent a morpholine residue.

As starting materials to be brominated by the process of the invention there may be mentioned, for example, N-phenyl-N':N'-dimethyl-urea,
N-phenyl-N':N'-diethyl-urea,
N-3-chlorophenyl-N'-methyl-urea,
N-3-chlorophenyl-N':N'-dimethyl-urea,
N-phenyl-N'-methyl-N'-methoxy-urea,
N-ethoxyphenyl-N':N'-dimethyl-urea,
N-3-methylphenyl-N':N'-dimethyl-urea,
N-3-chlorophenyl-N'-morpholine-urea,
N-3-chlorophenyl-N'-methyl-N'-butyl-urea,
N-phenyl-N'-morpholine-urea,
N-phenyl-N'-methyl-urea and
N-phenyl-N'-methoxy urea.

The bromination of the starting compounds may be carried out in the presence or absence of water.

The urea derivatives used as starting materials are advantageously brominated in the presence of a solvent or dispersing medium in which they are dissolved or suspended and, if desired, in the presence of an agent capable of binding acid, for example, sodium acetate.

As solvents or dispersing media for the starting materials to be brominated there may be used, for example, glacial acetic acid, chloroform, carbon tetrachloride, nitrobenzene, sulfuric acid, water or pyridine.

The bromination may be carried out with bromine itself or with a compound yielding bromine. There may be used organic and inorganic compounds containing bromine that are known to be suitable for brominating organic substances and compounds which yield bromine of their own accord or liberate bromine during the reaction. Examples are: hypobromous acid or salts thereof, especially alkali metal salts or alkaline earth metal salts, such as sodium hypobromite or calcium hypobromite, organic compounds that yield bromine, such as N-bromo-carboxylic acid amides or imides, especially N-bromo-succinimide, addition compounds of bromine with organic compounds, for example with pyridine, such as pyridine dibromide and similar brominating agents. The bromination is advantageously carried out at temperatures between 60° C. and 100° C., preferably at temperatures between 65 and 80° C.

The invention also provides preparations for combating undesirable plant growth, which comprise as an active substance a compound of the above general Formula I, provided that when $R_2$ represents a lower alkyl residue or a hydrogen atom, $R_1$ represents a lower alkyl or alkoxy group or a chlorine atom, and an inert carrier, a solvent, a diluent, an emulsifier, a dispersing agent, a wetting agent, an adhesive agent, a fertilizer, a fungicide, a bactericide, a nematocide, an insecticide or another herbicide.

Among the aforesaid preparations those which are specially suitable as herbicides are those which contain an active substance of the above general Formula I in which $R_1$ represents a lower alkyl or alkoxy group or a chlorine atom, $R_2$ represents a lower alkyl or alkoxy group, $R_3$ represents an alkyl group containing 1 to 4 carbon atoms or $R_2$ and $R_3$ together with the nitrogen may represent a morpholine residue.

The active substances may be used in an emulsified, dispersed or dissolved form or in a dusting preparation alone or together with another weed-killing agent, such as a tri- or tetra-substituted aryl-alkyl-urea, a halogenated phenoxy-alkane carboxylic acid, a halogenated benzoic acid, a halogenated phenyl-acetic acid, a halogenated fatty acid or a salt, ester or amide of such acid, or with a fertilizer or a pest-combating agent such as a chlorinated hydrocarbon or phosphoric acid ester. Alternatively, substances having a basic action such as tertiary or quaternary amines having a herbicidal action, may be incorporated with the preparations. Herbicidal carbamates, thiol-carbamates, dithiocarbamic acid esters or derivatives of symmetrical triazine may also be incorporated in the preparations. Likewise, herbicidal heterocycles, such as 2-chlorobenzthiazole, 3-amino-1:2:4-triazole, maleic acid hydrazide, 3:5 - dimethyl-tetrahydro-1:3:5-thiadiazine-2-thione, 1'-phenyl-4-amino-5-chloro-pyridazone-(6), or simpler herbicidal substances, such as pentachlorophenol, dinitrocresol, butyl-dinitrophenol, naphthyl-phthalamic acid or methyl isothiocyanate may be incorporated in the preparations.

For preparing solutions suitable for spraying as such there may be used, for example, organic solvents boiling above 100° C., e.g. mineral oil fractions boiling above 100° C., such as diesel oil or kerosene, or coal tar oils or oils of vegetable or animal origin, or hydrocarbons, such as alkylated naphthalenes, tetrahydronaphthalene, if desired, with the use of xylene mixtures, cyclohexanols, ketones, or chlorinated hydrocarbons, such as tetrachlorethane, trichlorethylene or tri- or tetra-chlorobenzenes.

As preparations that can be diluted with water to yield aqueous liquors for application as such there may be mentioned emulsion concentrates, pastes or wettable powders. As emulsifying or dispersing agents there are used nonionic products, such as condensation products of aliphatic alcohols, amines or carboxylic acids containing a hydrocarbon radical having 10 to 30 carbon atoms with ethylene oxide, such as a condensation product of octadecyl alcohol with 25 to 30 mols of ethylene oxide or of soya bean oil fatty acid with 30 mols of ethylene oxide or of commercial oleylamine with 15 mols of ethylene oxide or of dodecyl mercaptan with 12 mols of ethylene oxide. As anionic emulsifying agents there may be mentioned the sodium salt of dodecyl alcohol sulfuric acid ester, the sodium salt of dodecyl-benzene sulfonic acid, the potassium or triethanolamine salt of oleic acid or of abietic acid or of a mixture of these acids, or the sodium salt of a petroleum sulfonic acid. As cationic dispersing agents there may be used quaternary ammonium compounds, such as cetyl-pyridinium bromide or dihydroxy-ethyl-benzyl-dodecyl-ammonium chloride.

As solid carriers for making dusting or strewing powders there may be used talcum, kaolin, bentonite, calcium carbonate or calcium phosphate, or carbon cork meal or wood meal or other materials of vegetable origin. It is very advantageous to make up the preparations in a granulated form. The preparations in their various forms may also have incorporated therewith in the usual manner substances that improve their dispersibility, adhesion, resistance to rain or penetrating power, such as fatty acids, resins, glue, casein or, for example, alginates The preparations that have a selective action may also be used in conjunction with, for example, in admixture with a fertilizer.

The preparations of the invention are suitable for the selective killing of weeds growing among crop plants or for the total destruction of undesirable plant growth. As weeds there are included undesired crop plants that have been previously cultivated or are growing in the vicinity of desired crop plants.

The invention also provides compounds of the above general Formula I, in which $R_1$ represents a hydrogen atom or a lower alkyl or alkoxy group or a halogen atom, $R_2$ represents a lower alkoxy group, and $R_3$ represents a lower alkyl group, or in which $R_2$ and $R_3$ together with the nitrogen represent a morpholine residue.

The following examples illustrate the invention:

*Example 1*

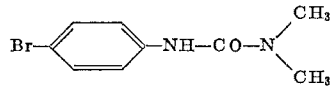

24.6 grams of N-phenyl-N':N'-dimethyl-urea are dissolved in 100 cc. of glacial acetic acid, and 12.3 grams of anhydrous sodium acetate are added. 24 grams of bromine dissolved in 30 cc. of glacial acetic acid are then added to the mixture at 70° C. in the course of 30 minutes. The bromine is immediately taken up by the solution. After a further 20 minutes, the solution is cooled and then stirred into 800 cc. of water, whereupon N-4-bromophenyl-N':N'-dimethyl-urea precipitates immediately in solid form. The product so obtained is filtered off with suction, well stirred in a dilute sodium carbonate solution, and again filtered off with suction. After washing the filter residue with water and drying it in vacuo, there are obtained 32 grams of crude product melting at 175–177° C. When recrystallized from acetonitrile, the bromination product melts at 172 to 174° C. The melting point of a mixture of the latter product with N-4-bromophenyl-N':N'-dimethyl-urea obtained in another way (from 4-bromophenyl-isocyanate+dimethylamine) is 173 to 174° C.

Analysis ($C_9H_{11}ON_2Br$).—Calculated: C, 44.46%; H, 4.56%; Br, 32.87%. Found: C, 44.71%; H, 5.07%, Br. 32.32%.

The compound of the formula

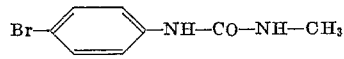

is obtained by the bromination of N-4-bromophenyl-N'-methyl-urea in a similar manner.

*Example 2*

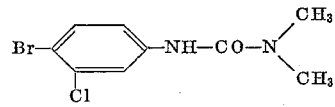

0.15 mol (29.8 grams) of N-3-chlorophenyl-N':N'-dimethyl-urea is dissolved in glacial acetic acid and brominated in the manner described in Example 1. The yield of crude N-3-chloro-4-bromophenyl-N':N-dimethyl-urea so obtained is 40 grams and it melts at 162 to 166° C. The melting point of the compound, when recrystallized from acetonitrile, is 165 to 168° C.

Analysis ($C_9H_{10}ON_2ClBr$).—Calculated: Cl, 12.77%; Br, 28.79%. Found: Cl, 12.62%; Br, 28.67%.

*Example 3*

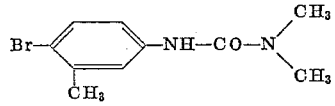

0.1 mol (26.7 grams) of N-3-methylphenyl-N':N'-dimethyl-urea is brominated in the manner described in Example 1. The yield of crude N-3-methyl-4-bromophenyl-N':N'-dimethyl-urea is 35 grams. The melting point of the product, when recrystallized from acetonitrile, is 153 to 156° C., and after recrystallization several times it melts at 155 to 157° C.

Analysis ($C_{10}H_{13}ON_2Br$).—Calculated: C, 46.71%; H, 5.14%; Br, 31.08. Found: C, 46.79%; H, 5.10%; Br, 30.77%.

*Example 4*

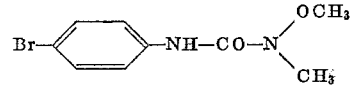

27 grams of N-phenyl-N'-methoxy-N'-methyl-urea are dissolved in 100 cc. of glacial acetic acid, 12.3 grams of anhydrous sodium acetate are added, and the bromination is carried out at 70° C.

The yield of crude N-4-bromophenyl-N'-methyl-N'-methoxy-urea is 34 grams. The crude product melts at 91 to 94° C., and, when recrystallized from cyclohexane, the product melts at 95 to 96° C. N-4-bromophenyl-N'-methyl-N'-methoxy-urea obtained by a known method from para-bromophenyl isocyanate and O:N-dimethyl-hydroxylamine melts at 95.5 to 96° C. A mixture of the latter with the compound prepared as described above melts at 94.5 to 95.5° C.

Analysis ($C_9H_{11}O_2N_2Br$).—Calculated: C, 41.72%; H, 4.28%; Br, 30.84%. Found: C, 41.89%; H, 4.43%; Br, 30.61%.

N-3-chloro-4-bromophenyl-N'-methyl-N'-methoxy-urea is obtained in a similar manner by the bromination of N-3-chloro-N'-methyl-N'-methoxy-urea.

Example 5

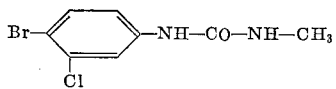

18.5 grams of N-3-chlorophenyl-N'-methyl-urea are dissolved in 80 cc. of glacial acetic acid at 75° C. To the solution are added, while stirring, 8.1 grams of dried sodium acetate and 16 grams of bromine, dissolved in 30 cc. of glacial acetic acid, are added dropwise. After 30 minutes, the reaction mixture is stirred into ice, whereupon the product immediately precipitates in solid form. After drying the precipitate in vacuo, there are obtained 25.5 grams of crude product melting at 147–150° C. When recrystallized from acetonitrile it melts at 155–157° C.

Analysis ($C_8H_8ON_2BrCl$).—Calculated: C, 36.46%; H, 3.06%; N, 10.63%; Cl, 13.45%; Br, 30.32%. Found: C, 36.51%; H, 2.93%; N, 10.73%; Cl, 13.12%; Br, 30.30%.

Example 6

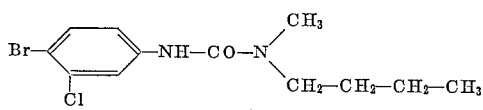

35.8 grams of N-3-chlorophenyl-N'-methyl-N'-butyl-urea are dissolved in 100 cc. of glacial acetic acid at 75° C., and 12.3 grams of anhydrous sodium acetate are added to the solution at that temperature. 24 grams of bromine, dissolved in 30 cc. of glacial acetic acid, are added dropwise in the course of half an hour. The bromine so added is immediately taken up by the solution. After stirring it for one hour, the solution is allowed to cool and then poured on to ice, whereupon the bromination product precipitates initially in the form of a resinous mass and then solidifies to a solid mass after standing for some time. The solid mass is pulverized, washed with an aqueous solution of sodium carbonate, and then dried in vacuo. The yield of the crude product so obtained is 45.5 grams, and melts at 89 to 91° C.

Analysis ($C_{12}H_{16}ON_2ClBr$).—Calculated: N, 8.76%; Cl, 11.09%. Found: N, 8.69%; Cl, 11.33%.

Example 7

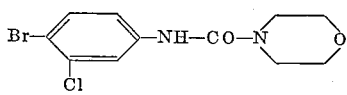

48 grams of N-morpholine-3-chlorocarbanilide (melting at 127–131° C.) are brominated in the manner described in Example 1. The yield of crude N-morpholine-3-chloro-4-bromocarbanilide is 56.6 grams. The melting point of the crude product is 115° C. When recrystallized from acetonitrile it melts at 145–147° C.

Analysis ($C_{11}H_{12}O_2N_2ClBr$).—Calculated: C, 41.34%; H, 3.78%; N, 8.77%; Cl, 11.09%; Br, 25.01%. Found: C. 41.56%; H, 3.91%; N, 8.92%; Cl, 11.03%; Br, 24.46%.

Example 8

N-morpholine-3-methylcarbanilide (melting at 124–125° C.) is brominated in the manner described in Example 1. The bromination product so obtained corresponds to the formula

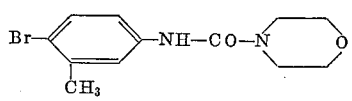

Melting point: 183° C.
Analysis ($C_{12}H_{15}O_2BrN_2$).—Calculated: N, 9.36%. Found: N, 9.15%.

Example 9

To 10 grams of each of the compounds obtained as described in Examples 2, 3, 4, 5, 6, 7 and 8 are added 2 grams of sulfite cellulose waste liquor and 100 cc. of water, and the mixtures are then subjected to intense grinding, to yield stable dispersions numbered 2, 3, 4, 5, 6, 7 and 8 of fine particle size, which contain the respective compounds mentioned above and which may be diluted as required with water.

Example 10

Flowerpots were filled with earth in a greenhouse and seeds of the following plants were sown therein: *Avena sativa, Setaria italica, Dactylis glomerata, Sinapis alba, Medicago sativa, Lepidium sativum and Calendula chrysantha.*

Two days after sowing, the flowerpots were treated with the dispersions Nos. 2 to 5, and 7 and 8 described in Example 9. The dispersions were applied at the rate of 10 kg. of active substance per hectare. 4 weeks later the test plants which had been treated with the dispersions Nos. 2, 3 and 4 were dead or almost dead. During the period of the tests *Avena sativa* was virtually undamaged by dispersions Nos. 5 and 8, and *Setaria italica* and *Avena sativa* were virtually undamaged by dispersion No. 7.

Example 11

The seeds of the following plants were sown in flowerpots in a greenhouse: *Avena sativa, Setaria italica, Dactylis glomerata, Sinapis alba, Medicago sativa, Lepidium sativum* and *Calendula chrysantha*. 10 to 14 days after sowing the plants were treated with spraying liquors prepared from dispersions Nos. 2 to 5, 7 and 8 described in Example 9, the dispersions being applied in each case at the rate of 10 kg. of active substance per hectare. All the test plants were dead or nearly dead 2 to 3 weeks after the treatments.

Example 12

Flowerpots were filled with earth in a greenhouse and seeds of the following plants were sown therein: *Medicago sativa, Lactuca sativa, Spinacia oleracea, Linum usitatissimum, Cannabis sativa, Daucus carota, Beta vulgaris, Poa trivialis, Alopecurus pratense* and *Allium cepa*.

Two days after sowing, the flowerpots were treated with the dispersions Nos. 2, 4 and 7 described in Example 9. The rate of application was 6 kg. of active substance per hectare. All the plants treated with the dispersions were dead or nearly dead 4 weeks after the treatment.

Corresponding results were obtained when the dispersions were applied to the test plants two weeks after sowing.

Example 13

Flowerpots were filled with earth in a greenhouse and the seeds of the following plants were sown therein: *Medicago sativa, Lactuca sativa, Spinacia oleracea, Linum usitatissimum, Beta vulgaris, Allium cepa, Daucus carota, Phaseolus vulgaris* and *Triticum vulgare*. Two days after sowing the flowerpots were treated with dispersion No. 6 of Example 9 at the rate of 6 kg. of active substance per hectare. 4 weeks after the treatment all the plants were dead or nearly dead, with the exception of *Daucus carota, Phaseolus vulgaris* and *Triticum vulgare*, which plants were either completely unaffected or other very slightly inhibited. Corresponding results were obtained when the dispersions were applied to the test plants about two weeks after sowing.

What is claimed is:
1. A process for the manufacture of compounds of the formula

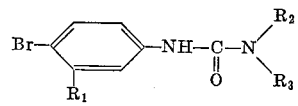

in which $R_1$ represents a member selected from the group consisting of a hydrogen atom, a lower alkyl radical, a lower alkoxy radical, a chlorine atom and a bromine atom, $R_2$ represents a member selected from the group consisting of a hydrogen atom, a lower alkyl radical and a lower alkoxy radical, $R_3$ represents a member selected from the group consisting of a lower alkyl radical and a radical forming together with the radical $R_2$ and the nitrogen atom the morpholine ring, wherein a compound of the formula

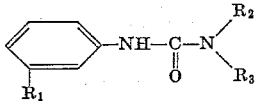

in which $R_1$, $R_2$ and $R_3$ have the meanings given in this claim, is treated with a brominating agent.

2. A process as claimed in claim 1, wherein bromine is used as brominating agent in the presence of glacial acetic acid and anhydrous sodium acetate.

3. A process for the manufacture of the compound of the formula

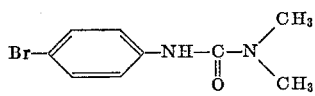

wherein N-phenyl-N':N'-dimethyl-urea is treated with bromine in the presence of glacial acetic acid and anhydrous sodium acetate.

4. A process for the manufacture of the compound of the formula

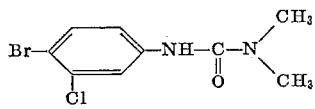

wherein N-3-chlorophenyl-N':N'-dimethyl-urea is treated with bromine in the presence of glacial acetic acid and anhydrous sodium acetate.

5. A process for the manufacture of the compound of the formula

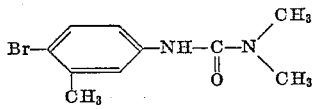

wherein N-3-methylphenyl-N':N'-dimethyl-urea is treated with bromine in the presence of glacial acetic acid and anhydrous sodium acetate.

6. A process for the manufacture of the compound of the formula

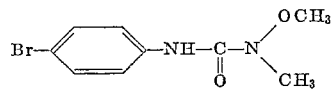

wherein N-phenyl-N'-methoxy-N'-methyl-urea is treated with bromine in the presence of glacial acetic acid and anhydrous sodium acetate.

7. A process for the manufacture of the compound of the formula

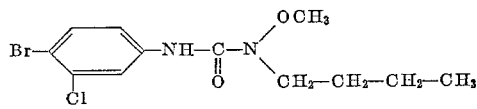

wherein N - 3 - chlorophenyl-N'-methyl-N'-n-butyl-urea is treated with bromine in the presence of glacial acetic acid and anhydrous sodium acetate.

8. A process as claimed in claim 1, wherein the bromination is carried out of a temperature between 60 and 100° C.

References Cited by the Examiner
UNITED STATES PATENTS

| | | | |
|---|---|---|---|
| 2,655,444 | 10/1953 | Todd | 260—553 |
| 2,655,446 | 10/1953 | Todd | 260—553 |
| 2,663,729 | 12/1953 | Searle et al. | 260—553 |
| 2,663,730 | 12/1953 | Hill et al. | 260—553 |
| 2,704,245 | 3/1955 | Searle et al. | 71—2.6 |
| 2,705,195 | 3/1955 | Cupery et al. | 71—2.6 |
| 2,764,478 | 9/1956 | Searle | 260—553 |
| 2,913,322 | 11/1959 | Beavers et al. | 260—247.2 |
| 2,960,534 | 11/1960 | Scherer et al. | 260—553 |

OTHER REFERENCES

Keefer et al.: J. Amer. Soc., vol. 78 (1956), pp. 255–9.
Lowry et al.: Introduction to Organic Chemistry, seventh edition (1951), pp. 245–6.

ALEX MAZEL, *Primary Examiner.*

IRVING MARCUS, NICHOLAS S. RIZZO, HENRY R. JILES, *Examiners.*

UNITED STATES PATENT OFFICE
CERTIFICATE OF CORRECTION

Patent No. 3,288,851

November 29, 1966

Henry Martin et al.

It is hereby certified that error appears in the above numbered patent requiring correction and that the said Letters Patent should read as corrected below.

Column 4, line 75, for "N-3-chloro-N´-methyl-N´-methoxy-urea" read -- N-3-chloro-phenyl-N´-methyl-N´-methoxy-urea --; column 8, lines 13 to 17, the right-hand portion of the formula should appear as shown below instead of as in the patent:

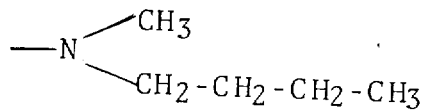

Signed and sealed this 29th day of April 1969.

(SEAL)
Attest:

Edward M. Fletcher, Jr.
Attesting Officer

EDWARD J. BRENNER
Commissioner of Patents